INVENTOR.
HARRY KIHN
BY J. L. Whittaker
ATTORNEY

Aug. 30, 1960

H. KIHN 2,951,245

ELECTRICAL CIRCUITS

Filed March 12, 1957

7 Sheets-Sheet 2

INVENTOR.
HARRY KIHN
BY J. L. Whittaker
ATTORNEY

Aug. 30, 1960 H. KIHN 2,951,245

ELECTRICAL CIRCUITS

Filed March 12, 1957 7 Sheets-Sheet 3

INVENTOR.
HARRY KIHN
BY J. L. Whittaker
ATTORNEY

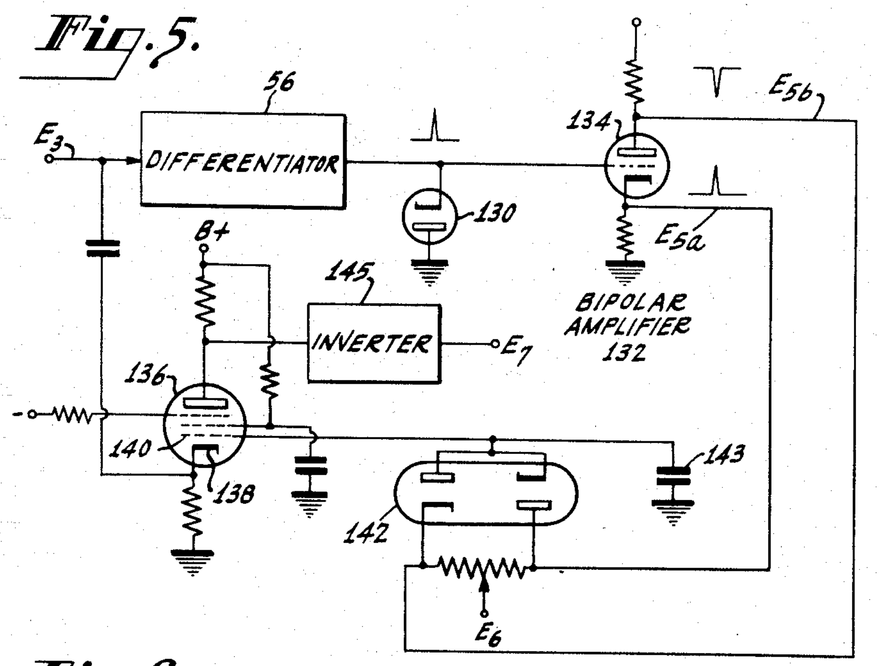
Fig. 6.
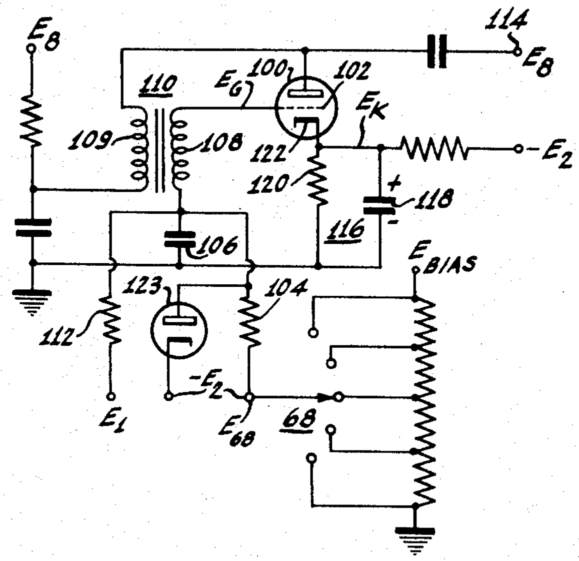
INVENTOR.
HARRY KIHN
BY J. L. Whittaker
ATTORNEY

Aug. 30, 1960 H. KIHN 2,951,245

ELECTRICAL CIRCUITS

Filed March 12, 1957

7 Sheets-Sheet 5

INVENTOR.
HARRY KIHN
BY J. L. Whittaker
ATTORNEY

INVENTOR.
HARRY KIHN
BY J. L. Whittaker
ATTORNEY

Aug. 30, 1960

H. KIHN 2,951,245

ELECTRICAL CIRCUITS

Filed March 12, 1957

7 Sheets-Sheet 7

INVENTOR.
HARRY KIHN
BY J. C. Whittaker
ATTORNEY 2,951,245

ELECTRICAL CIRCUITS

Harry Kihn, Lawrenceville, N.J., assignor to Radio Corporation of America, a corporation of Delaware Filed Mar. 12, 1957, Ser. No. 645,608

17 Claims. (Cl. 343—13)

The present invention relates to new and improved magnetic circuits and to improved systems which include such circuits.

An object of this invention is to provide an improved circuit which is capable of switching an input signal to a selected one of a plurality of output circuits or, conversely, which is capable of switching a selected one of a plurality of input signals to a common output circuit.

Another object of the invention is to provide an improved magnetic circuit which is capable of switching an input signal to different ones of a plurality of output circuits in a selected order.

Another object of this invention is to provide an improved magnetic circuit which is capable of cyclically switching an input signal to different ones of a plurality of output circuits in succession.

Another object of this invention is to provide an improved pulse amplitude decoder circuit.

Still another object of the present invention is to provide, in a radar system, an improved means for dividing a range interval into a plurality of shorter range intervals and for selecting one or more of the shorter intervals for display on the radar indicator.

Yet another object of this invention is to provide an improved means which is useful as a stepping relay in telephone code selection systems.

A basic component of the present invention is a transfluxor type of magnetic circuit. These are described generally in articles by J. C. Rajchman and A. W. Lo in the March 1956 issue of the "Proceedings of the IRE," pages 321–332, and in the June 1955 issue of the "RCA Review," pages 303–311. A transfluxor magnetic device, in general, is formed of magnetic material of the type which remains saturated at remanence. There are a plurality of distinct closed flux paths in the material. These may be formed by fabricating apertures in the material. In a device formed with two holes, a clear winding may link one of the holes. An intense undirectional current pulse may be applied to this winding for producing saturating magnetic flux in the same direction along all of the flux paths. In this condition, the device is blocked. If the direction of flux is changed in one of the paths, the device is unblocked and a signal may be passed through the device by suitable windings linking the other aperture.

The magnetic device of the present invention comprises an elongated member formed of magnetizable material which is substantially saturated at remanence and formed with $n$ spaced apertures along its length, where $n$ is is an integer greater than 2. The member includes a plurality of flux paths, one between each pair of adjacent apertures and one between an end aperture and the end of the member adjacent that end aperture. Means coupled to the member produce saturating flux along all of the paths in the same direction. The direction of flux along the paths is then changed in selected sequence so as to unblock the apertures in a selected order. Input means and output means are coupled to the member at the apertures.

In one form of the invention, the saturating flux is produced by applying a current pulse to a winding located in an end one of the apertures. The direction of flux is changed by applying a set current or set pulse or pulses either to the same winding or another winding in the same end aperture. A single winding links all apertures except the end one in which the winding mentioned above is located. This single winding may be the input means or the output means according to the use to which the invention is put. Individual windings link sucessive ones of the apertures. The individual windings are output windings if the single winding is an input winding, and input windings if the single winding is an output winding.

In one form of the invention, the set current pulses are of sucessively increasing amplitudes and of sufficient intensity to change the direction of saturating flux along the flux paths in sucession. If an alternating current or pulse type signal is applied to an input winding which links all apertures except the end one in which the clear winding is located, output signals may be taken from the apertures in succession. The output means may comprise separate windings linking successive ones of the apertures.

The device above is also useful for decoding a current pulse. The pulse to be decoded is applied to the second winding in the end aperture. Its amplitude determines which one of the remaining apertures is unblocked. An alternating current signal applied to a winding linking all of the apertures except the end one passes through the unblocked aperture.

In a radar system embodiment of the present invention, an object-returned echo occurring in a range increment of interest is applied to the winding which links all apertures except the end one. A undirectional clear current pulse which is synchronous with the transmitted signal is applied to the clear winding in the end aperture to clear the magnetic device. A set current pulse having an effective sense opposite to that of the clear pulse, an amplitude roughly proportional to the start of a range increment of interest, and a duration proportional to the range increment is applied to the second winding linking the end aperture. Separate output windings link each aperture except the end one. A selected one of the windings, depending on the amplitude of the pulse applied to the second winding, is connected to the display means of the radar system. When an arrangement of this type, object-returned echoes in only a selected portion of a radar range interval pass to the display means.

In a preferred form of the radar embodiment of the invention, "step" or "stair-step" type of current wave is applied to the second winding. This type of wave has discrete steps of successively increasing amplitude. The duration of a step is proportional to a radar range interval of interest. The amplitudes of the steps are such that successive ones of the apertures are unblocked, whereby object returned echoes in successive range intervals of interest appear in successive ones of the output windings. These windings may be connected to a plurality of separate radar indicators, each of which displays a different portion of the entire radar range.

The invention will be described in greater detail by reference to the following description taken in connection with and accompanying drawing in which:

Figure 1 is a top view of a magnetic circuit according to the present invention;

Figures $2a$ to $2d$ are drawings to aid in explaining how the circuit of Figure 1 operates;

Figure 5 is a schematic circuit diagram of a stair-step wave generator which may be used in the circuit of Figure 3;

Figure 6 is a schematic circuit diagram of a pulse selector circuit which may be used in the embodiment of the invention shown in Figure 3;

Figure 1:
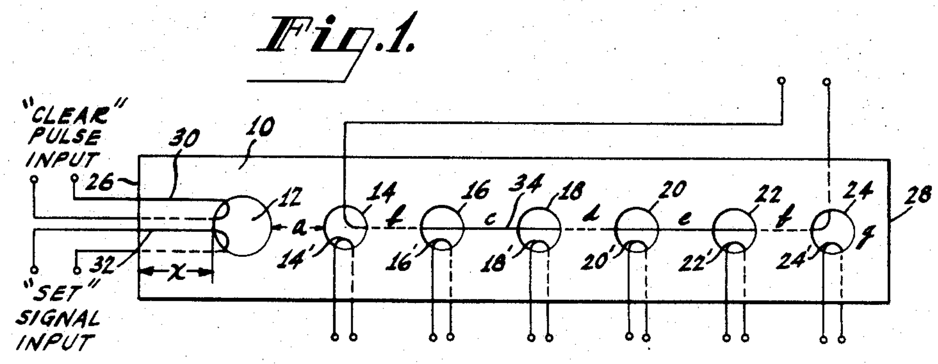

Referring to Figure 1, elongated member 10 is formed of magnetic material which remains saturated at remanence. Although many different materials are possible, the member may be molded from a powder-like manganese-magnesium-ferrite and annealed at a suitably high temperature to obtain the desired magnetic characteristics. A large aperture 12 and a plurality of smaller apertures 14, 16, 18, 20, 22 and 24 are formed in member 10. If a longitudinal cross section were taken through the center of the transfluxor, the area of the magnetic material along dimension *x* would be at least equal to and preferably somewhat greater than the sum of the cross-sectional areas along dimensions *a*, *b*, *c*, *d*, *e*, *f* and *g*. The reason for this is described in the above-identified article and need not be explained in further detail here. A "clear" unidirectional current pulse may be applied to clear winding 30. A "set" unidirectional current pulse may be applied in an opposite polarity to the same winding. However, it is more convenient to employ a separate set winding 32, as shown. Winding 34, which links all of the smaller apertures, may be an input winding or an output winding, as will be explained below. Windings 14', 16', 18', 20', 22' and 24' link the similarly numbered apertures. These windings are input windings if winding 34 is an output winding and output windings if winding 34 is an input winding.

Figure 2:
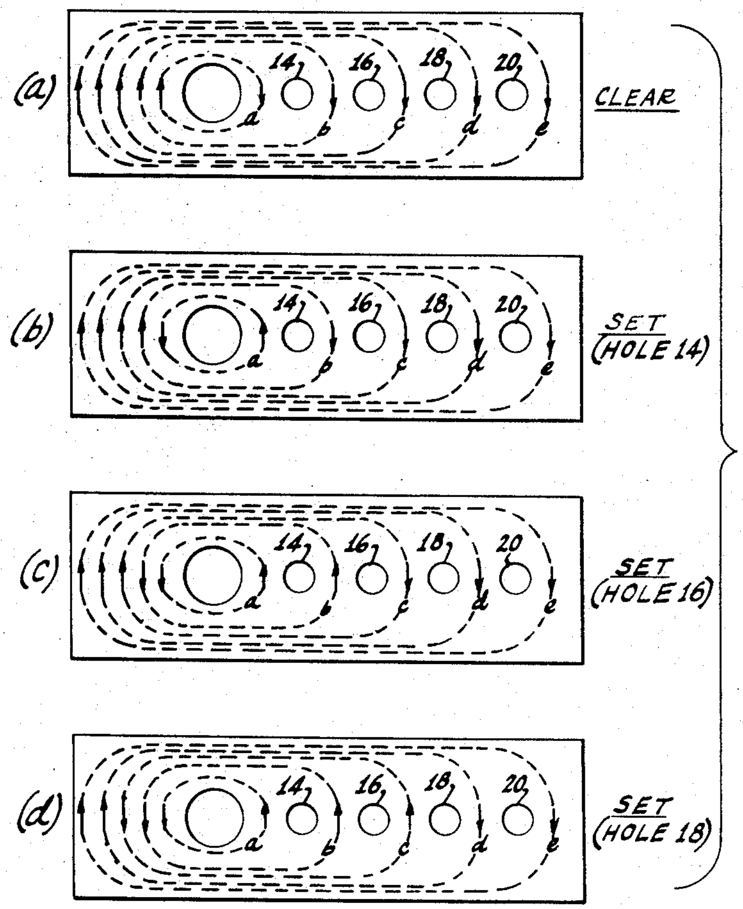

The operation of the magnetic circuit of Figure 1 can be understood by referring both to Figures 1 and 2. For the sake of drawing simplicity, one large aperture and four small apertures are shown in Figure 2, however, the principles apply to a magnetic circuit having any number of apertures.

When a clear pulse of direct current of sufficient intensity is applied to winding 30, saturating flux is established along paths *a–e* in the same direction. This is indicated by the arrows along paths *a–e*, all of which point in the same direction. A current pulse or a direct current may now be applied to winding 32 (or, in the embodiment with a single control winding, to winding 30) in a sense which tends to produce a saturated flux in member 10 in a direction opposite to that indicated in Figure 2*a*. Assume, for example, that the amplitude of this pulse or direct current is sufficient to reverse the direction of flux only along path *a*. The resulting flux pattern is as shown in Figure 2*b*. Hole 14 is unblocked as the direction of flux in legs *a* and *b* are opposite one another. However, the remaining holes 16, 18 and 20 remain blocked. If winding 34 (Figure 1) is assumed to be an input winding and an alternating current signal or a pulse type signal is applied to this winding, an output signal will now appear in winding 14' but not in any other of the output windings.

Assume now that either a second current pulse of increased amplitude is applied to winding 34 or that the direct current applied to this winding is increased in amplitude. In both cases, the new amplitude is sufficient to reverse the direction of flux in leg *b*. The resulting flux pattern is as shown in Figure 2*c*. The flux along legs *a* and *b* is in the same direction, whereas it is in different directions along legs *b* and *c*. Aperture 14 is now blocked and aperture 16 unblocked. Again, if winding 34 (Figure 1) is an input winding, an alternating current or pulse signal applied to winding 34 will appear at winding 16' but in no other output winding.

Figure 2*d* illustrates the situation when the set pulse or D.C. signal is increased in amplitude an amount sufficient to reverse the direction of flux along leg *c*. Now aperture 18 is unblocked but all of the remaining apertures are blocked.

Summarizing the operation of the circuit of Figure 1, an intense pulse may be applied to the clear winding 30 to clear the circuit. The clear pulse, in effect, blocks all apertures in the circuit. The set signal may consist of a current of successively increasing amplitude for successively unblocking apertures 14, 16, 18, 20, 22 and 24. If an alternating current signal is applied to winding 34 simultaneous with the application of the set signal to winding 32, this alternating current signal appears successively in windings 14', 16', 18', 20', 22' and 24'. Only one of the last-named windings is energized at a time since all remaining windings are in blocked apertures.

The circuit is also operative in the reverse direction. If input signals are applied to windings 14'–24', these will be switched to the common output winding 34 in succession as apertures 14–24 are successively unblocked.

The operation of the magnetic circuit as a pulse amplitude decoder is as follows. A clear pulse is first applied to winding 30. This blocks all apertures. An alternating current signal is applied to winding 34. Since all apertures are blocked, no signal appears in any of windings 14'–24'. The pulse whose amplitude is to be decoded is applied to set winding 32 in a sense to tend to reverse the direction of flux along paths *a–g*. The amplitude of the pulse determines which one of the paths has its flux direction reversed, for example, if the pulse is of low amplitude, it may only reverse the direction of flux in path *a*. In such case, an alternating current signal applied to winding 34 will appear at winding 14'. On the other hand, the signal amplitude may be sufficient to reverse the direction of flux in all paths through *f*. In such case, an alternating signal applied to winding 34 will appear at output winding 24'. Windings 14'–24' may lead to a computer or other output circuit.

Figure 3:
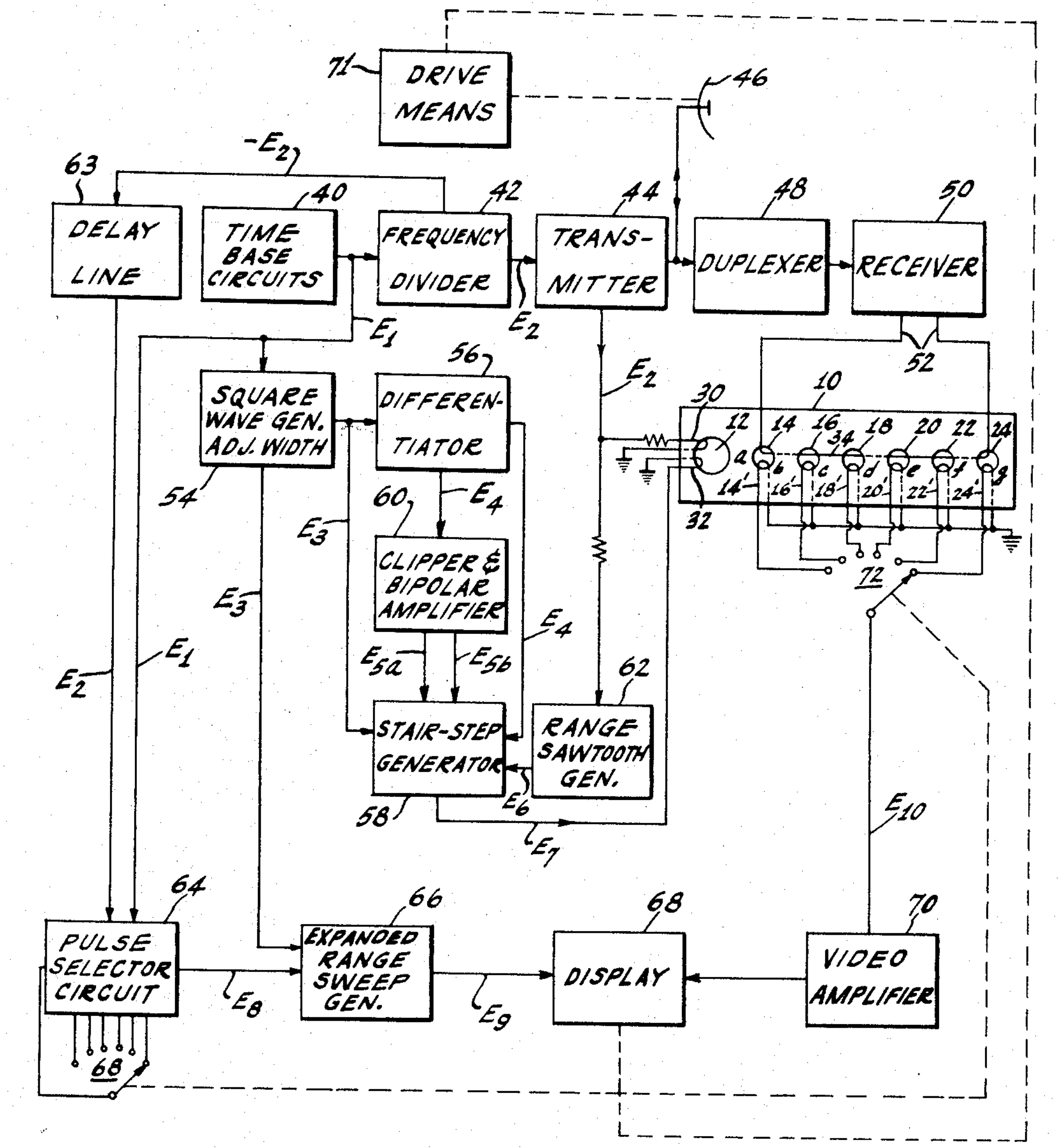
Figure 3 is a block circuit diagram of a radar embodiment of the present invention.
Figure 4:
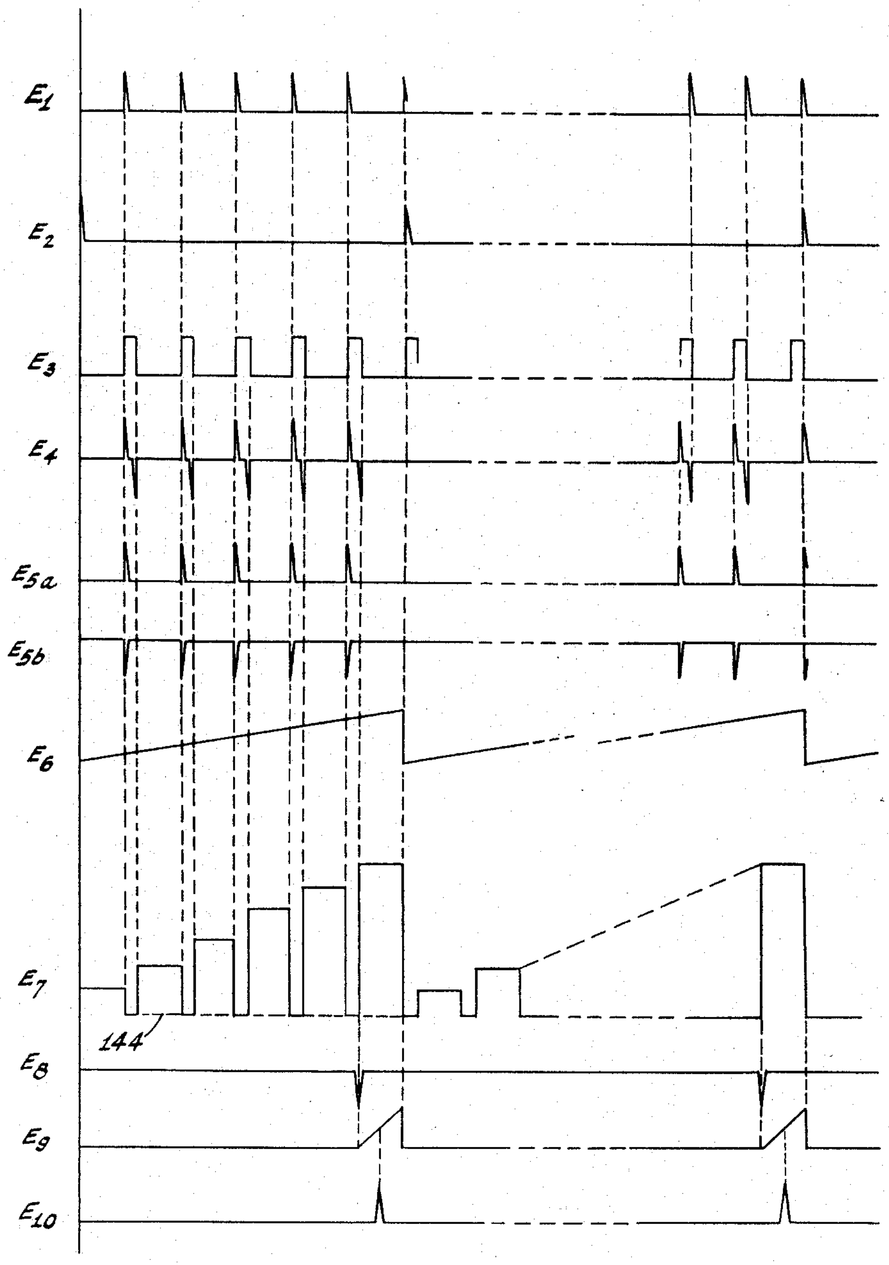
Figure 4 is a drawing of waveforms present at various places in the circuit of Figure 3.

A radar system embodiment of the invention is shown in block form in Figure 3. The time base circuits 40, which may include a sine wave oscillator and a means for converting the sine wave into unidirectional pulses $E_1$ spaced fixed intervals from one another, supplies its output to frequency divider 42. The frequency divider produces output pulses $E_2$ at a frequency sub-harmonically related to the frequency of pulses $E_1$. Pulses $E_1$ and $E_2$ and other waves to be discussed below are shown in Figure 4. Pulses $E_1$ may be at a frequency of 1,000 pulses per second and $E_2$ at a frequency of 100 pulses per second. Pulses $E_2$ are applied to transmitter 44 which in turn supplied radio-frequency output pulses synchronous with pulses $E_2$ to directive antenna 46.

Some of the radiated pulses which strike reflecting objects are reflected back to antenna 46 and through duplexer 48 to receiver 50. The duplexer may be a gas-filled tube commonly termed a transmit-receive device and the receiver a conventional radar receiver. The video pulse output of the receiver is applied via leads 52 to winding 34 of magnetic device 10.

Returning to the upper left portion of Figure 3, pulses $E_1$ are also applied to square wave generator 54 which may include a singly-stable multivibrator. The multivibrator includes an adjusting means such as a means for changing the multivibrator bias for changing the duration of its square wave output $E_3$. The square wave duration determines the range increment displayed on display 68. Square wave $E_3$ is applied directly to stair-step generator 58. It is also differentiated in circuit 56, which may comprise a resistor-condenser time constant network, and applied through bipolar amplifier 60 to the stair-step generator 58. The stair-step geenrator also receives a saw-tooth wave $E_6$ generated synchronously with pulses $E_2$ by range sawtooth generator 62. (A detailed explanation of the stair-step generator circuit is given later.) The output wave $E_7$ of the stair-step generator is applied to the set winding 32 of magnetic device 10.

Returning again to the upper left portion of Figure 3, pulses $E_1$ are applied directly to pulse selector circuit 64, and pulses $E_2$ are applied through delay line 63 to circuit 64. The function of circuit 64 is to select a given one of pulses $E_1$ during each transmit-receive cycle of the radar system and apply it to the expanded range sweep generator 66.

Figure 7:
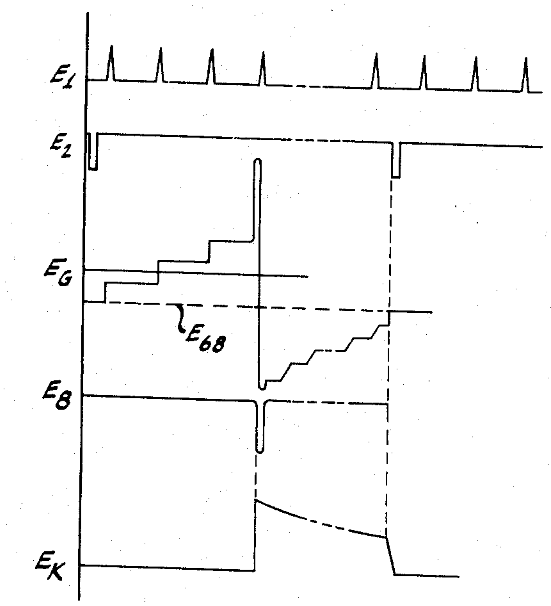
Figure 7 is a drawing of waveforms present in the circuit of Figure 6.

One form of pulse selector circuit which may be employed as block 64 is shown in Figure 6. The circuit consists of a special type of blocking oscillator. Triode 100 is normally maintained cut off by the bias potential $E_{68}$ applied to its control grid 102 from the movable contact of switch 68. The contact selects one of a number of possible bias voltages and applies it through coupling resistor 104 to the junction of capacitor 106 and the secondary winding 108 of pulse transformer 110. Pulses $E_1$ are applied through resistor 112 to the same junction. The discharge circuit for condenser 106 is through resistance 104 which is of relatively large value. The charging circuit for the condenser, through resistor 112, has a relatively small time constant. Thus, the pulses $E_1$ applied to condenser 106 cause the condenser to charge in successive steps. The resultant voltage $E_g$ on the control grid 102 is shown in Figure 7, as are the other voltages to be discussed in connection with the circuit of Figure 6.

Eventually, the control grid of 102 reaches a potential such that tube 100 conducts. The current through the tube is applied to the primary winding 109 of pulse transformer 110 in a sense quickly to drive triode 100 beyond cut off, in usual blocking oscillator fashion. Thus, intense negative pulse $E_8$ (shown in reduced scale) is produced at the anode of tube 100 and applied to terminal 114 which leads to the range sweep generator 66 (Figure 3).

The blocking oscillator must now be prevented from firing before the next complete cycle of pulses $E_2$. This may be accomplished by the cathode bias circuit 116. When triode 100 fires, a bias voltage is developed across capacitor 118 of the bias circuit. Resistor 120 across the capacitor is of relatively large value and prevents the capacitor from discharging rapidly. The resultant bias voltage $E_k$ developed at cathode 122 is of sufficient amplitude to maintain the triode cut off for the remainder of the cycle. The wave shape of $E_k$ is shown in Figure 7.

The triode 100 is made ready to conduct again by pulses $E_2$ applied to the cathode 122. The pulses are of the correct sense to discharge capacitor 118.

The number of steps required to fire the blocking oscillator is determined by the setting of switch 68 which in turn determines the base line $E_{68}$ from which the step wave must start. The more negative $E_{68}$, the greater the number of steps required to fire the blocking oscillator.

The purpose of diode 123 is to discharge the condenser 106 to the bias potential $E_{68}$ at the beginning of each cycle. This is done by applying pulses $-E_2$ to the cathode of the diode, as shown, effectively short circuiting resistor 104, and thereby permitting condenser 106 to discharge to $E_{68}$.

Figure 8:
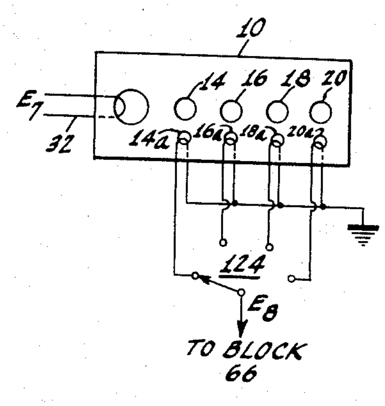
Figure 8 is a modified form of a pulse selector circuit which may be incorporated in the circuit of Figure 3.

A second type of selector circuit is shown in Figure 8. When using a circuit of this type, blocks 63 and 64 (Figure 3) may be eliminated, the trigger voltage $E_8$ being taken from the magnetic device 10 itself. The magnetic device is of modified form. It includes a plurality of small holes 14*a*, 16*a*, 18*a* and 20*a*, one for each of the larger holes. The smaller holes are located immediately in front of the larger holes. As the stair-step wave $E_7$ is applied to set winding 32, successive ones of the pulses introduce successive transient pulse signals in the windings linking holes 14*a*, 16*a*, 18*a* and 20*a*. These windings are connected to switch 124 which permits the selection of any one of the pulses.

Figure 9:
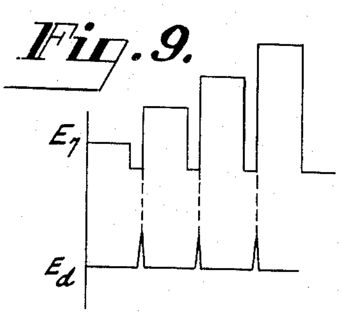
Figure 9 shows waveforms present in the circuit of Figure 8.

The waveforms $E_7$ and $E_d$ are illustrated in Figure 9. $E_7$ is the stair-step wave, and $E_d$ the voltage pulses induced in successive ones of the windings in the smaller holes.

Referring again to Figure 3, expanded range sweep generator 66 is triggered by the pulses applied to it by the selector circuit 64. Generator 66 also receives square wave $E_3$. The function of the range sweep generator is to produce a sawtooth wave having a duration equal to the square wave $E_3$ synchronously with the selected one of pulses $E_1$. Preferably, the amplitude of the wave is adjustable by means of a hand control, not shown. This wave is applied to the deflection means of display 68, which may, for example, be a cathode ray tube indicator. In one form of the invention, the display means is a PPI type of display and the deflection means a rotatable coil driven in synchronism with the antenna 46 by antenna drive means 70 (upper portion of the figure). Alternatively, a servo drive system may be employed. A signal is applied to intensity modulate indicator 68 from a selected one of output coils 14′–24′, via video amplifier 70.

In operation, each time transmitter 44 transmits a radio-frequency pulse, it applies an intense current pulse $E_2$ to the clear winding 30 of magnetic device 10. This pulse is at a relatively high power level and may be taken from the transmitter modulator or from a separate amplifying stage. The pulses are of sufficient amplitude to cause saturating flux in paths *a* through *g*, whereby all apertures in the magnetic device are blocked.

The stair-step waveform $E_7$ is applied to the set winding 32 of the magnetic device. The succeeding pulses of a given cycle of stair-step waveform are of sufficient amplitude to successively unblock apertures *a* through *g*.

Object-returned echoes are applied via leads 52 to winding 34 which links all apertures. Switch 72 is closed to a winding corresponding to a range interval of interest. For example, if it is assumed that the range of the radar system is 60 miles, aperture 24 may correspond to a range interval extending from 50 to 60 miles or so, depending on the duration of the last step the stair-step waveform. In such case, only echoes returned from targets in the range interval from 50 to 60 miles will induce a voltage $E_{10}$ in winding 24′. The voltage is applied through video amplifier 70 to the control grid of cathode-ray tube indicator 68.

The deflection voltage $E_9$ for the cathode ray tube indicator is produced by sweep generator 66. It covers the entire range interval from 50 to 60 miles.

Although in the embodiment of Figure 3 only a single cathode ray tube indicator is employed, it is possible simultaneously to display the various range increments. One way of doing this is to connect a separate indicator to each output winding. Each indicator should have its own range sweep generator 66, and the latter are each connected to a separate pulse selector circuit 64. Another way is to use but a single indicator having an A-type display consisting of a plurality of base lines, one above the other, somewhat similar to a loran display. Each base line corresponds to a given range increment. Stage 64 is eliminated. Loran type circuits may be used to displace the base lines from one another.

One embodiment of a stair-step generator and associated circuits is shown in schematic form in Figure 5. Square wave $E_3$ is applied to differentiator 56 to produce the differentiated wave $E_4$ (see Figure 4). A diode 130 is connected across the output circuit of the differentiator and its function is to eliminate the negative-going ones of the pulses. The bipolar amplifier 132 consists of a triode 134 having an anode load circuit and a cathode load circuit. Thus, the incoming positive-going pulses appear as negative-going pulses $E_{5b}$ in the triode anode circuit and as positive-going pulses $E_{5a}$ in the triode cathode circuit.

The stair-step generator tube consists of a pentode 136. The square wave $E_3$ is applied to the cathode 138. Its function is to cause the pentode to be alternately driven from cut off into conduction. The sawtooth voltage $E_6$ is applied through diode clamps 142, when they conduct, to storage condenser 143. Thus, the condenser charges in steps to successively higher values. In other words, each time pulses $E_{5a}$ and $E_{5b}$ are applied to the clamps 142, both diodes conduct, and condenser 143 and control grid 140 are clamped to the instantaneous value of voltage $E_6$, whereby the output wave at the anode of the pentode is a stair-step wave. Inverter 145 produces wave $E_7$.

Figure 12:
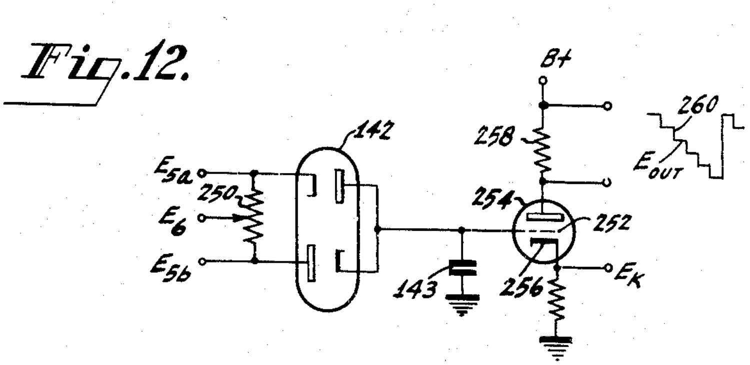
Figure 12 is a schematic diagram of another type of stair-step generator which may be used in the system of Figure 3.

Figure 12 illustrates another type of stair-step generator which may be used in the present invention. As in the embodiment of Figure 5, positive and negative going pulses $E_{5a}$ and $E_{5b}$ are applied through diode clamping circuit 142 to a storage condenser 143. A potentiometer 250 is connected across the input circuit of the diode clamps and a sawtooth wave $E_6$ is applied to the center tap of the potentiometer. As in the embodiment of Figure 5, the diode clamps 142 are normally cut off, however, when pulses $E_{5a}$ and $E_{5b}$ are applied to the clamps, both diodes conduct. When the diodes conduct, storage capacitor 143 and the control grid 252 to which it is connected are clamped to the instantaneous amplitude of the sawtooth wave. Since this amplitude increases as a function of time, the charge stored in condenser 143 assumes a stair-step type waveform.

Triode 254 is normally maintained slightly beyond cut off by the bias voltage $E_k$ applied to its cathode 256. However, as condenser 143 charges in successive steps, triode 254 conducts successively more current, also in successive steps. The output voltage $E_{out}$ developed across anode load resistor 258 is in the stair-step form shown at 260. Note that the steps do not return to the reference voltage level at the end of each individual step.

Figure 13:
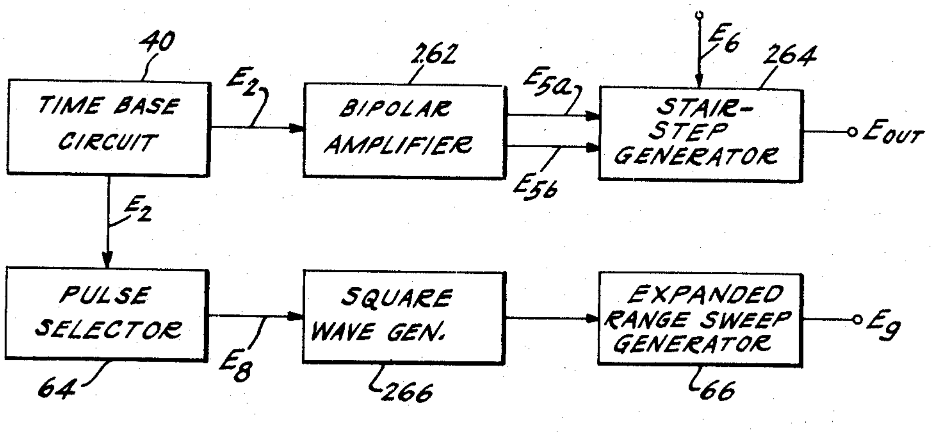
Figure 13 shows some modifications in the circuit of Figure 3 when the generator of Figure 12 is used.

The stair-step generator of Figure 12 produces a wave, the steps of which are of fixed duration. However, when this circuit is used, the system is greatly simplified. The modifications necessary in the circuit of Figure 3 are shown in Figure 13. Time-base circuit 40 applies its output pulses $E_2$ directly to the bipolar amplifier 262, thus eliminating differentiator 56 and the clipper portion of block 60 (Figure 3). As already shown in Figure 12, the output pulses $E_{5a}$ and $E_{5b}$ of the bipolar amplifier are applied directly to the stair-step generator 264. The output pulses $E_2$ of the time-base circuits are also applied directly to the pulse selector circuit 64. It selects a given one ($E_8$) of pulses $E_2$ and applies it to a square wave generator stage 266. The latter may be a monostable multivibrator which produces a square wave of fixed duration (one equal to the duration of a step). The square wave output of generator 266 is applied to expanded range sweep generator 66. The operation of the circuit shown in Figure 13 is analogous to that of the analogous components shown in Figure 3.

Figure 10:
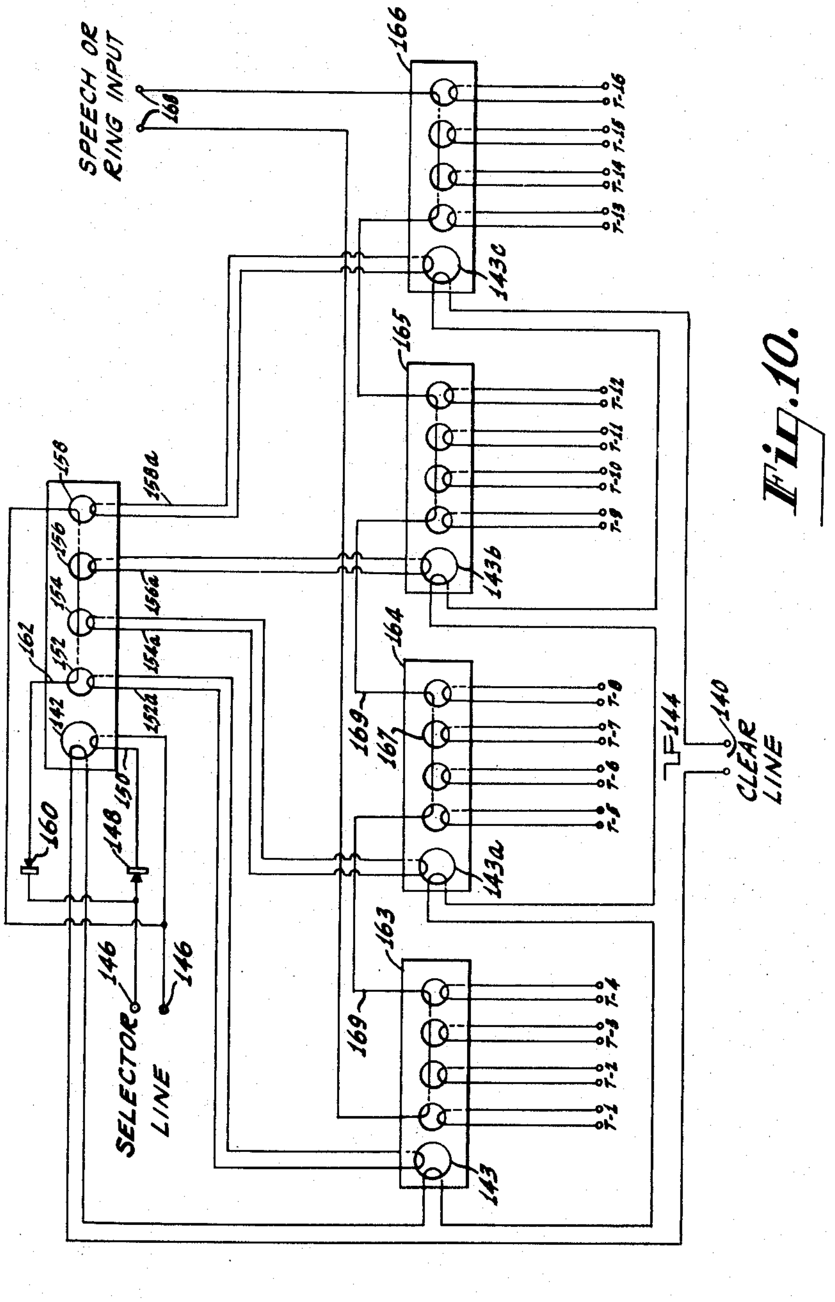
Figure 10 is a diagram showing how the present invention may be used in a telephone circuit in a manner analogous to the use of stepping relays of telephone circuits.

An embodiment of this invention which is useful in telephone circuits is shown in Figure 10. For the purpose of illustration, transfluxors are shown which have one large hole and four smaller holes. It will be shown that a circuit of this type can control 16 telephones. However, more or fewer than this number of holes may be used for controlling more or fewer than 16 telephones.

Figure 11:
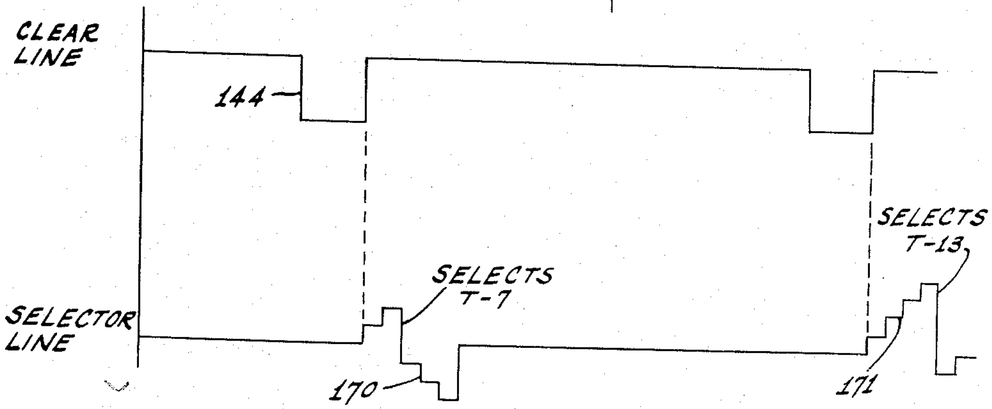
Figure 11 is a drawing of waveforms present at various points of the circuit of Figure 10.

Referring to Figures 10 and 11, after a telephone conversation is terminated, a clear pulse is applied to terminals 140. Terminals 140 are connected to a winding which links the end aperture 142 of the first transfluxor and the end apertures 143, **143*a*, 143*b* and 143*c* of the remaining transfluxors. Preferably, said remaining transfluxors are of smaller size and the first transfluxor. The linking winding serves the same function as the winding 30 of the embodiment of Figure 1. In other words, the clear pulse 144** applied to the clear winding blocks all holes in all transfluxors.

When it is desired to connect an incoming call to one of a number of telephones, a selector signal is applied to terminals 146. The selector signal is as shown in Figure 11. It consists of a positive-going step wave immediately followed by a negative-going step wave. The wave may correspond to dialing two numbers on a telephone, for example. The maximum number of steps in each portion of the selector wave is four.

The positive-going portion of the wave is applied through diode 148 to winding 150 in the first hole. This winding corresponds to the set signal winding 32 of the embodiment of Figure 1. Successive steps of the positive-going portion of the selector wave successively unblock holes 152, 154, 156 and 158.

The negative-going portion of the selector wave passes through diode 160 to winding 162 which links holes 152, 154, 156 and 158. Output windings **152*a*, 154*a*, 156*a* and 158*a* are linked to the similarly numbered holes. Each winding leads to a corresponding winding in the first hole of transfluxors 163, 164, 165 annd 166. The winding in the first hole of transfluxors 163—166 corresponds to the set signal input winding 32** of the embodiment of Figure 1.

Each of the smaller holes in transfluxors 160, 162, 164 and 168 leads to a telephone. The telephones are numbered $T_1$ to $T_{16}$.

In operation, assume that after the line is cleared, it is desired to ring telephone $T_7$. This may be accomplished by applying a step wave 170 (Figure 11) to the selector line terminals 160. Step wave 170 consists of two positive-going steps and three negative-going steps. The positive-going steps unblock hole 154. All of the remaining holes in the first transfluxor are blocked. The negative-going step wave passes through diode 160 to winding 162. Since hole 154 is the only one in the first transfluxor which is unblocked, the wave passes through this hole and winding **154*a*, to hole 143*a* in transfluxor 164. Since there are three steps, the third aperture 167, which leads to telephone $T_7$, is unblocked. If a speech or ring input signal is now applied to terminals 168 of winding 169, which links all the small holes in transfluxors 163–166**, it will pass to telephone $T_7$.

After the telephone conversation is completed, a clear pulse 144 is again applied to terminals 140 and all of the holes in all of the transfluxors are again blocked. Now, any one of the 16 telephones may again be connected by applying a suitable selector signal to terminal 146. With the selector signal 171 (shown in Figure 11) applied to terminals 146, telephone $T_{13}$ is connected.

What is claimed is:

1. A magnetic circuit comprising an elongated member formed of a magnetizable material which is substantially saturated at remanence and formed with $n$ spaced apertures along its length, where $n$ is an integer greater than 2, said member including a plurality of flux paths, one between each pair of adjacent apertures, and one between an end aperture and the end of the member adjacent that end aperture; means coupled to said member for magnetizing said member so as to produce saturating flux along all of said paths in the same direction; means coupled to said member for changing the direction of flux along said paths in a selected sequence; means for applying an input signal to said member; and means for deriving an output signal from said member.

2. A magnetic circuit comprising an elongated member formed of a magnetizable material which is substantially saturated at remanence and formed with *n* spaced apertures along its length, where *n* is an integer greater than 2, said member including a plurality of flux paths, one between each pair of adjacent apertures, and one between an end aperture and the end of the member adjacent that end aperture; means coupled to said member for magnetizing said member so as to produce saturating flux along all of said paths in the same direction; means coupled to said member for individually changing the direction of flux along said paths in succession; means coupled to said member for applying an input signal thereto; and means coupled to said member for deriving an output signal therefrom.

3. A magnetic circuit comprising an elongated member formed of a magnetizable material which is substantially saturated at remanence and formed with *n* spaced apertures along its length, where *n* is an integer greater than 2, said member including a plurality of flux paths, one between each pair of adjacent apertures, and one between an end aperture and the end of the member adjacent that end aperture; means coupled to said member for magnetizing said member so as to produce saturating flux along all of said paths in the same direction; means coupled to said member for changing the direction of flux along said paths in a preselected order; a plurality of windings, each coupled to said member at a different aperture; and a single winding linking at least most of said apertures.

4. A magnetic circuit comprising an elongated member formed of a magnetizable material which is substantially saturated at remanence and formed with *n* spaced apertures along its length, where *n* is an integer greater than 2, the portions of the member between adjacent ones of said apertures and between an end aperture and the end of the member adjacent said end aperture defining respective flux paths; a winding linking the other end one of said apertures; means for applying a unidirectional current pulse to said winding of an amplitude sufficient to produce saturating magnetic flux in the same direction along all of said paths; a second winding linking said other end aperture; and means for applying a unidirectional current pulse to said second winding in a sense to tend to produce a saturating flux along one or more of said paths in a direction opposite to said given direction and of adjustable amplitude.

5. A magnetic circuit comprising an elongated member formed of a magnetizable material which is substantially saturated at remanence and formed with *n* spaced apertures along its length, where *n* is an integer greater than 2, the portions of the member between adjacent ones of said apertures defining respective flux paths; a winding linking an end one of said apertures; means for applying a unidirectional current pulse to said winding of given sense and of an amplitude sufficient to produce saturating magnetic flux in the same direction along all of said paths; a second winding linking said end aperture; and means for applying a step type current wave to said second winding the successive steps of said wave having a sense and amplitude such that the direction of flux along said paths is reversed in a selected order.

6. A magnetic circuit comprising an elongated member formed of a magnetizable material which is substantially saturated at remanence and formed with *n* spaced apertures along its length, where *n* is an integer greater than 2, the portions of the member between adjacent ones of said aperture defining respective flux paths; a winding linking an end one of said apertures; means for applying a unidirectional current pulse to said winding of given sense and of an amplitude sufficient to produce saturating magnetic flux in the same direction along all of said paths; a second winding linking said end aperture; and means for applying a stair-step wave to said second winding having steps of successively increasing amplitude, the successive ones of said steps having a sense and amplitude such that the direction of flux along said paths is reversed in succession.

7. A magnetic circuit comprising an elongated member formed of a magnetizable material which is substantially saturated at remanence and formed with *n* spaced apertures along its length, where *n* is an integer greater than 2, said member including a first flux path between one end aperture and the end of the member adjacent said end aperture, and a plurality of other flux paths, one between each pair of adjacent apertures, and one between the other end aperture and the end of the member adjacent the other end aperture; means coupled to said member for magnetizing said member so as to produce saturating flux in one direction along the first path and in the opposite direction along all other of said paths; means coupled to said member for changing the direction of flux along said paths in a selected order; a winding linking all of said apertures except said one end aperture; and a plurality of other windings, one for each aperture except said one end aperture, each coupled to said member at its aperture.

8. A circuit for switching an input signal to one of a number of output circuits depending upon the time of occurrence of the signal comprising, in combination, an elongated member formed of a magnetizable material which is substantially saturated at remanence and formed with *n* spaced apertures along its length, where *n* is an integer greater than 2, said member including a first flux path between one end aperture and the end of the member adjacent said end aperture, and a plurality of other flux paths, one between each pair of adjacent apertures, and one between the other end aperture and the end of the member adjacent the other end aperture; a winding coupled to said one end aperture for receiving a direct current of sufficient magnitude to produce saturating flux in one direction along the first path and in the opposite direction along all other of said paths; a second winding in said one end aperture for receiving a direct current wave having a plurality of steps, and having a polarity and amplitude such that the direction of flux along said other paths is reversed in succession; a winding linking all of said apertures except said one end aperture for receiving the signal it is desired to switch to one of the number of output circuits; and a plurality of other windings, one for each aperture except said one end aperture, each coupled to said member at its aperture.

9. A circuit for switching an input signal to one of a number of output circuits depending upon the time of occurrence of the signal comprising, in combination, an elongated member formed of a magnetizable material which is substantially saturated at remanence and formed with *n* spaced apertures along its length, where *n* is an integer greater than 2, said member including a first flux path between one end aperture and the end of the member adjacent said end aperture, and a plurality of other flux paths, one between each pair of adjacent apertures, and one between the other end aperture and the end of the member adjacent the other end aperture; a winding coupled to said one end aperture for receiving a direct current of sufficient magnitude to produce saturating flux in one direction along the first path and in the opposite direction along all other of said paths; a second winding in said one end aperture for receiving a direct current wave having a plurality of steps, and having a polarity and amplitude such that the direction of flux along said other paths is reversed in succession; a winding linking all of said apertures except said one end aperture for receiving the signal it is desired to switch to one of the number of output circuits; a plurality of other windings, one for each aperture except said one end aperture, each coupled to said member at its aperture, connections for load circuit; and means for connecting the desired one of said other windings to said load circuit.

10. A pulse amplitude decoder comprising, in combination, an elongated member formed of a magnetizable material which is substantially saturated at remanence and formed with $n$ spaced apertures along its length, where $n$ is an integer greater than 2, said member including a first flux path between one end aperture and the end of the member adjacent said end aperture, and a plurality of other flux paths, one between each pair of adjacent apertures, and one between the other end aperture and the end of the member adjacent the other end aperture; a winding in said one end aperture for receiving a direct current pulse for magnetizing the member to produce saturating flux in one direction along the first path and in the opposite direction along all other of said paths; a second winding in said one end aperture to which the pulse to be decoded may be applied in an effective sense and amplitude to change the direction of flux along one or more of the other of said paths; a winding linking all of said apertures except said end aperture to which an alternating current signal may be applied; and a plurality of other windings, one for each aperture except said one end aperture, each coupled to said member at its aperture.

11. A radar system comprising, in combination, transmitter means for transmitting pulses of radio frequency energy to targets; receiver means for receiving echoes returned from said targets; display means for displaying said echoes; and an elongated member formed of a magnetizable material which is substantially saturated at remanence and formed with $n$ spaced apertures along its length, where $n$ is an integer greater than 2, said member including a first flux path between one end aperture and the end of the member adjacent said end aperture, and a plurality of other flux paths, one between each pair of adjacent apertures, and one between the other end aperture and the end of the member adjacent the other end apertures; a winding in said one end aperture connected to said transmitter for receiving current pulses from said transmitter synchronous with said transmitted pulses and of sufficient amplitude to produce saturating flux in one direction along the first path and in the opposite direction along all other of said paths; a second winding in said one end aperture; stair-step generator means coupled to said second winding for applying thereto a stair-step waveform the steps of which each have a duration which is a fraction of the entire radar range of the radar system, said wave being applied to said second winding in a polarity and amplitude to successively change the direction of flux along said other paths; a single winding linking all of said apertures except said one end aperture and connected to receive the output signal of said receiver means; a plurality of other windings, one for each aperture except said one end aperture, each coupled to said member at its aperture; and switch means for connecting a selected one of said other windings to said display means.

12. In combination, at least two magnetic circuits, each comprising an elongated member formed of a magnetizable material which is substantially saturated at remanence and formed with $n$ spaced apertures along its length, where $n$ is an integer greater than 2, and each member including a plurality of flux paths, one between each pair of adjacent apertures, and one between an end aperture and the end of the member adjacent that end aperture; means coupled to both members for magnetizing said member so as to produce saturating flux along all of said paths in the same direction; a winding in an end one of the apertures of the first magnetic circuit adapted to have a step wave applied thereto, the succeeding steps of which successively unblock the remaining apertures in the first member; a second winding linking a given one of the remaining apertures in said first elongated member with an end aperture in the second elongated member; and a third winding linking all apertures in the first elongated member and adapted to have a step type wave applied thereto which, when said given aperture is unblocked, passes through said second winding and unblocks the remaining apertures in the second elongated member in succession.

13. In combination, $n+1$ transfluxor type magnetic circuits, each formed with a control aperture and $n$ other apertures where $n$ is an integer greater than 1; a clear winding in the control aperture of all circuits for applying a blocking signal to all circuits; a set winding in the control aperture of the first transfluxor for applying a signal to the first circuit which unblocks the $n$ remaining apertures therein in a selected sequence; $n$ windings, each linking a different one of the $n$ apertures in the first circuit, respectively, and each winding leading to a control aperture in a different one of the remaining $n$ circuits; and a winding linking the $n$ apertures in the first circuit for applying a step type signal which can pass through an unblocked aperture in the first circuit, the successive steps of which are of sufficient amplitude successively to unblock the $n$ apertures in the circuit to control apertures of which they are applied.

14. A magnetic circuit comprising a member formed of a magnetizable material which is substantially saturated at remanence and formed with at least three spaced apertures including first control aperture and second and third controlled apertures of smaller size than the control aperture and spaced different distances from the control aperture, the portion of the member between the first and second and second and third apertures defining respective flux paths; a winding linking the control aperture; means for applying a unidirectional current to said winding of an amplitude sufficient to produce saturating magnetic flux in the same direction along both of said flux paths; a second winding linking said end aperture; means for applying a unidirectional current of an opposite sense to said second winding of an amplitude sufficient to reverse the direction of flux along the path between the first and second apertures and then of an amplitude sufficient to reverse the direction of flux along the path between the second and third apertures.

15. A magnetic circuit comprising a member formed of a magnetizable material which is substantially saturated at remanence and formed with at least three apertures including a control aperture and two smaller, controlled apertures, the second spaced further from the control aperture than the first, said member including flux paths between all apertures and between said second controlled aperture and the end of the member adjacent said second controlled aperture; means coupled to said member for magnetizing said member so as to produce saturating flux along all of said paths in the same direction; and means coupled to said member for individually changing the directions of flux along said paths, one at a time.

16. A magnetic circuit comprising a member formed of a magnetizable material which is substantially saturated at remanence and formed with at least three apertures including a control aperture and two smaller controlled apertures, the second spaced further from the control aperture than the first, said member including flux paths between all apertures and between said second controlled aperture and the end of the member adjacent said second controlled aperture; and means including a winding in the control aperture and a control circuit connected to the winding for applying different amounts of current to the winding for individually changing the directions of flux along all paths, in succession.

17. A magnetic circuit comprising a member formed of a magnetizable material which is substantially saturated at remanence and formed with three spaced, aligned apertures including a control first aperture and controlled second and third apertures, arranged in the order named, said member including flux paths between all apertures and between said third aperture and the end of the member adjacent the third aperture; control circuit means coupled to the first aperture for magnetizing the member to produce saturating flux along all paths in the same direction; and control circuit means coupled to the control aperture for applying different amounts of input current to said member in a sense to change the direction of said flux and of successive discrete amplitudes such that the directions of flux along successive paths are changed in order.

References Cited in the file of this patent

UNITED STATES PATENTS

| | | |
|---|---|---|
| 2,814,794 | Bauer | Nov. 26, 1957 |
| 2,818,555 | Lo | Dec. 31, 1957 |
| 2,818,556 | Lo | Dec. 31, 1957 |

BEST AVAILABLE COPY

UNITED STATES PATENT OFFICE

CERTIFICATE OF CORRECTION

Patent No. 2,951,245 — August 30, 1960

Harry Kihn

It is hereby certified that error appears in the printed specification of the above numbered patent requiring correction and that the said Letters Patent should read as corrected below.

Column 1, line 52, for "undirec-" read -- unidirec- --, line 64, delete "is" first occurrence; column 2, line 20, for "sucession" read -- succession --, line 36, for "undirectional" read -- unidirectional --; column 8, line 33, for "annd" read -- and --.

Signed and sealed this 11th day of April 1961.

(SEAL)
Attest:

ERNEST W. SWIDER
Attesting Officer

ARTHUR W. CROCKER
Acting Commissioner of Patents